A. H. KNAPP.

CURTAIN FIXTURES.

No. 7,182. Reissued June 20, 1876.

WITNESSES

E. M. Gallaher

W. E. Chaffee

By

A. Hayden Knapp, INVENTOR,

J. S. Brown his Attorney.

UNITED STATES PATENT OFFICE.

A. HAYDN KNAPP, OF NEWTON, MASSACHUSETTS.

IMPROVEMENT IN CURTAIN-FIXTURES.

Specification forming part of Letters Patent No. 129,893, dated July 30, 1872; reissue No. 7,182, dated June 20, 1876; application filed May 19, 1876.

*To all whom it may concern:*

Be it known that I, A. HAYDN KNAPP, of Newton, in the county of Middlesex and State of Massachusetts, have invented certain Improvements in Curtain-Fixtures; and I do hereby declare that the following is a full and exact description thereof, reference being had to the accompanying drawings, making part of this specification—

Figure 1:
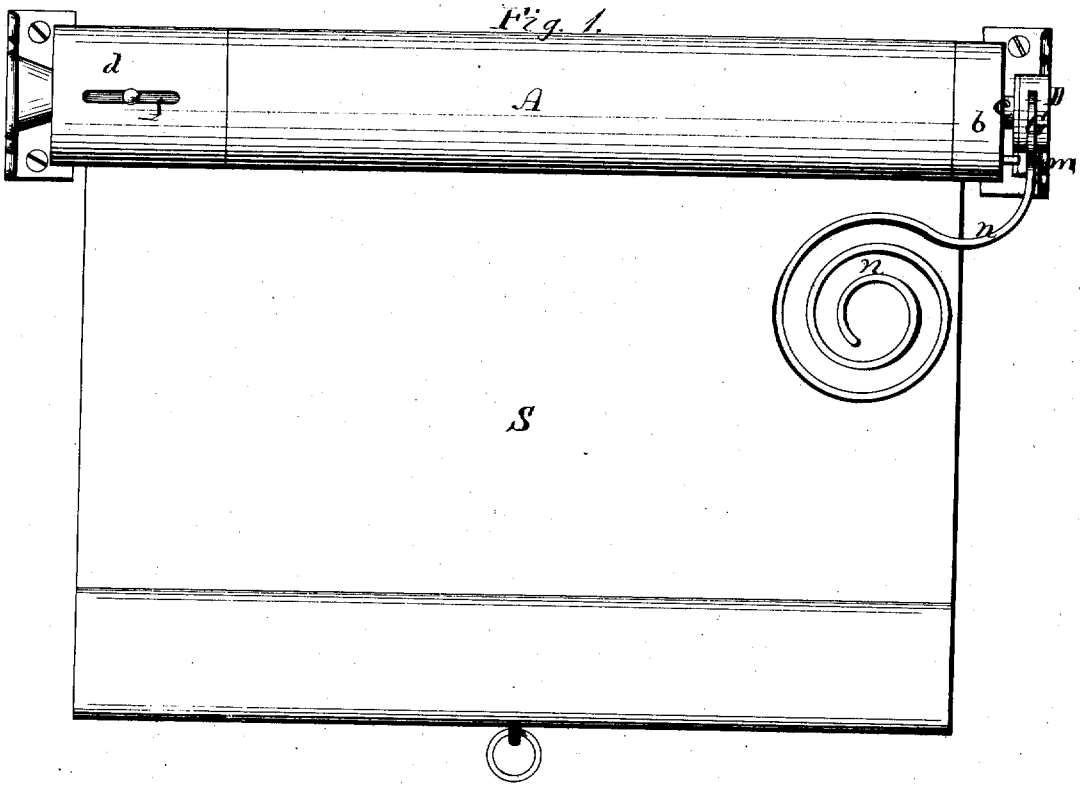
Figure 2:
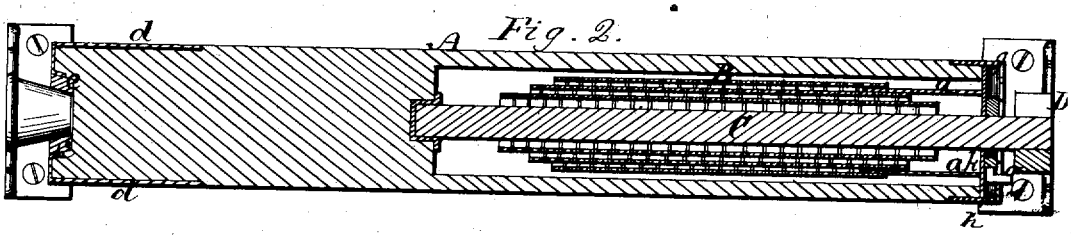
Figure 3:
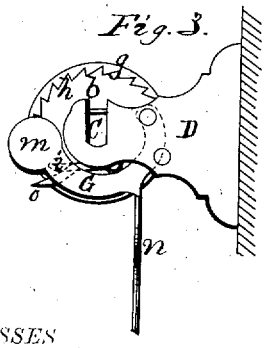
Figure 4:
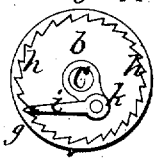

Figure 1 being a front view of a curtain-roller, with the curtain and fixtures, provided with my improvements; Fig. 2, a central longitudinal section of the roller with the fixtures; Fig. 3, an end view of the same; Fig. 4, an end view of the roller with its spindle, and with a ratchet and pawl, which constitute, in connection with the roller, spindle, and the actuating-spring, the principal features of my invention.

Like letters designate corresponding parts in all of the figures.

The main feature of my invention consists in a self-acting ratchet device, in connection with a spring-actuated curtain-roller, and in so arranging the fixture that either the said self-acting ratchet device may be employed as such, or may be inactive, and allow it to operate as a simple spring-balance fixture, with a weighted slat or tassel, according to preference.

Also, by this invention I produce a spring-roller which is convenient to operate, and which may be taken down at any time without unwinding the spring, and whereby a weighted tassel or slat may be dispensed with, if desired.

Also, by an improved bearing, when the balance device is used, the trouble of an imperfectly-balancing spring, which tends to cause the shade to run up at the bottom, and down at the top, of the window, is nearly obviated.

My invention also consists in a special feature of improvement, which I shall first describe in place.

Although an ordinary spring may be used in combination with my principal improvements, I prefer to use my improved redoubled-layer spring, patented September 5, 1871; but there is one objection to winding the outer layer of the said spring shorter than the next interior layer, since, where the end is attached to the roller-case, the pressure upon the said interior layer, produced by a kind of leverage of the spring near the point of attachment, is so great as to cause the adjacent surfaces of the layers to rub one another, thereby roughening the same, so as to grate harshly and make a disagreeable noise.

I obviate this objection by extending a tube or hollow cylinder, *a*, from the adjacent roller-cap *b* inward a short distance between the outer layer and the next inner layer of the spring B, thus forming a smooth bearing for the outer layer, and entirely relieving the other layers of the said spring of the pressure, and preventing their winding close around or against the spindle.

In order to obviate in a great measure, if not to entirely prevent, the running up of the shade at the bottom, and the running down thereof at the top, of the window, I employ an enlarged bearing, *c*, made of some soft metal, as shown at the left-hand end of the roller, this bearing turning on a fixed pivot of the bracket; and a similar enlarged bearing may be used at the spring end of the roller, the bearing turning on an enlargement of, or an enlarged pivot-surface around, the spindle of the roller.

I find that this enlargement of the bearing or bearings of the roller affords sufficient friction to hold the shade stationary when once at rest, though it offers no inconvenient resistance while the shade is in motion. And, as a further assistance in this respect, as well as to furnish a wider bearing-surface in the eyes of the caps *b* and *d*, the said caps are made first with a smaller perforation, and then the metal is swaged so as to produce an extended surface. This also causes the bearing to wear better and to be less liable to creaking. Since windows of the same house and nominally of the same width are apt to vary in width considerably, sometimes a quarter of an inch or more, there is a difficulty in cutting the rollers to fit all, unless at the house, from actual measurement of each window. To obviate this necessity, I make the tube or side of the blank cap *d* considerably longer than usual, and form a longitudinal slot or notch, *f*, therein, in which to drive a fastening nail or screw, so that the cap may be driven farther on or less far, thereby shortening or lengthening the roller to suit the window, and still the cap shall be held firmly on the roller.

The self-acting ratchet fixture, which constitutes the principal feature of this invention, is constructed with a notched inner periphery or ratchet, *h*, on a projecting flange, *g*, of the roller-cap *b*, into which ratchet takes a detent or pawl, *i*, pivoted to a fixed projection, *k*, on the spindle C, or for retaining the shade when the fixture is mounted—it might be on the bracket D—the said detent being so arranged as to fall by its own weight into the notches of the ratchet and hold the roller A from winding up the shade, and so that a slight lifting thereof will disengage it from the ratchet. Below this detent is situated a lifter, G, preferably acting as a lever, and pivoted to the bracket D, in such a way that, on raising its main arm *m*, which projects forward, and has a projection, *o*, under the detent *i*, the said detent is lifted out of the ratchet. Another arm or projection of the lifter terminates in, or has attached to it, a rod or wire, *n*, or its equivalent, which extends downward and laterally, so as to be suspended or held in position close in front of the shade S. The device being thus constructed and arranged, when the shade is simply drawn in its proper plane or position it will not disturb the detent, which will hold the shade securely from being moved upward by the force of the roller-spring; but by swinging the shade outward a little it pushes forward the wire *n*, and thereby, through the lifter G, lifts the detent away from the ratchet, and allows the spring-roller to wind up the shade, which it will continue to do while the shade is thus held forward; but the detent immediately descends and engages with the ratchet the moment that the shade is allowed to drop into its natural suspended position. The wire or rod *n* may be made to hang behind the shade; but there is an objection to such an arrangement, in that, when the shade runs close up to the roller, above the wire, there is nothing to prevent its swinging forward and lifting the detent, so as to allow the shade-roller to continue revolving, except the resistance of the slat or tassel of the shade.

In general, the wire or its equivalent may be arranged in any way so that a lateral movement of the shade will thereby lift the detent. This device is very efficient and convenient in action, offering two especial and important advantages over all other ratchet-and-pawl fixtures in use, particularly those depending on centrifugal force to liberate the pawl: First, if the shade slips from the hands it immediately swings into its vertical position and locks the ratchet, so that it can run up but a very short distance, whereas if the shade gets away with the centrifugal fixture it runs to the top of the window with violence, causing great annoyance from the noise, and damaging the shade by tearing the hem, or entirely ripping it from the slat. But this fixture always stops the shade when fully run up the moment the same falls into the vertical position, while the centrifugal-fixture shade often keeps on unwinding from the roller until the spring loses its active force by uncoiling; second, when the shade is drawn down to any desired point it does not start back more than one-fourth of an inch, or the distance which one notch of the ratchet allows, so that when it is brought down to the window-sill it stays there; whereas, with the centrifugal fixture, the shade is liable to run back three or four inches, making it difficult to cover the bottom of the window, and, with deep box-window casings, if the shade is drawn forward and down lower than the window-sill it is liable to get soiled by the dust thereon.

To change the ratchet-fixture into a simple balance-fixture the spindle C of the roller is turned half-way round in the bracket, thereby turning the pawl over so as always to swing away from the ratchet as long as the roller remains mounted in the brackets; but upon the removal of the roller therefrom the pawl is caused by centrifugal action to at once engage with the ratchet in the same manner as if impelled by gravity, and thus prevents the roller-spring from unwinding.

What I claim as my invention, and desire to secure by Letters Patent, is—

1. A pawl lifter or disengager, G, in combination with a spring-actuated curtain-roller, provided with a ratchet-and-pawl shade-retaining device, so arranged that a lateral movement of the shade from its vertical or hanging position lifts or disengages the pawl from the ratchet and allows the shade to rise, and the return of the shade to its vertical position allows the pawl again to engage with the ratchet, substantially as herein specified.

2. In combination with the spindle of a spring-actuated curtain-roller, a clutch, which upon the removal of the spindle from its bracket is caused by centrifugal force to engage with the roller, so as to prevent further unwinding of the spring, substantially as herein specified.

3. An enlarged bearing or bearings, *c*, for a spring-actuated curtain-roller, A, made of soft metal, in combination with a pivot-projection of the bracket, which supports the end of the roller, substantially as and for the purpose herein specified.

4. A tubular bearing, extending inward between the coils or layers of a redoubled-layer spring, substantially as and for the purpose herein specified.

A. HAYDN KNAPP.

Witnesses:
JOHN CATER,
CHAS. H. CUSHMAN.